Feb. 1, 1966 C. DOOLITTLE ET AL 3,232,311
VALVE DEVICE
Original Filed Nov. 30, 1960 3 Sheets-Sheet 1
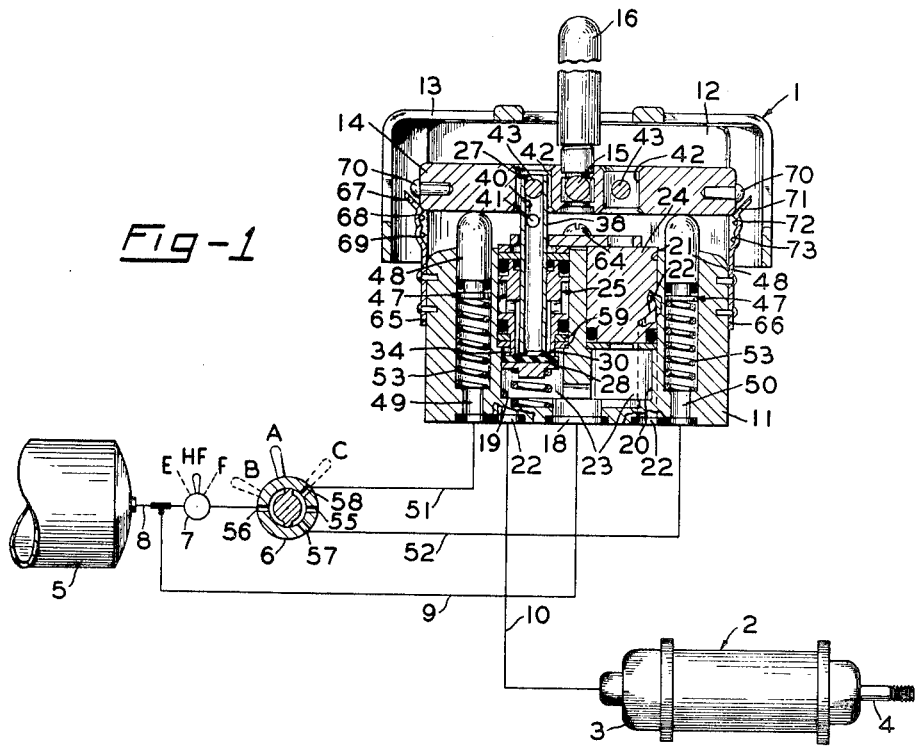
Fig-1
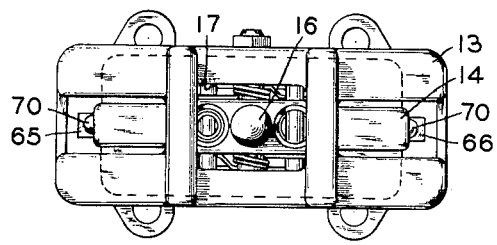
Fig-2
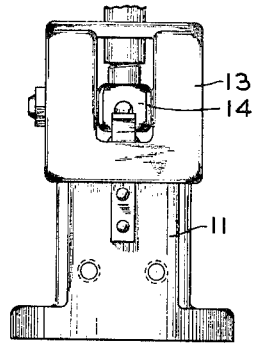
Fig-3
Fig-4
INVENTORS
CHARLES DOOLITTLE
BY ARTHUR J. BENT
Ralph W. McIntire, Jr.
ATTORNEY Feb. 1, 1966  C. DOOLITTLE ET AL  3,232,311
VALVE DEVICE Original Filed Nov. 30, 1960  3 Sheets-Sheet 3

INVENTOR.
CHARLES DOOLITTLE
ARTHUR J. BENT
BY Ralph W. McIntire, Jr.
ATTORNEY

United States Patent Office 3,232,311
Patented Feb. 1, 1966

3,232,311
VALVE DEVICE
Charles Doolittle and Arthur J. Bent, Pittsburgh, Pa., assignors to Westinghouse Air Brake Company, Wilmerding, Pa., a corporation of Pennsylvania
Continuation of application Ser. No. 72,600, Nov. 30, 1960. This application July 17, 1963, Ser. No. 295,789
14 Claims. (Cl. 137—271)

This application is a continuation of application Serial No. 72,600, filed November 30, 1960, now abandoned.

This invention relates to pneumatic pressure control valve devices and, more particularly, to control valve devices for selectively controlling the operation of remotely positioned actuators or power operating units.

In fluid pressure systems there is oftentimes employed an actuator of the type in which the operating or work performing member is required to be selectively positioned to perform its intended function. Such actuators are generally provided with a power cylinder including a pressure responsive piston means having a work performing member suitably connected thereto. Conventionally, the control valve devices are employed between the source of pneumatic pressure and the actuators to selectively control the supply, exhaust or lap of the pneumatic pressure to and from one side or opposite sides of the piston means in the actuator cylinders thereby to move the piston means in either direction and, accordingly, position the operating member to perform its particular operation.

It is desirable that the control valve device employed with the actuator be constructed so that it is not only capable of locating the operating member at its limits of travel, as defined by the limits of piston travel, but that it also be capable of selectively locating the operating member at different points intermediate these limits. Further, when such locating structure is provided, it is desirable that means be provided on the control valve device for holding the operating member in this location after the operator has made the desired adjustment.

Conventionally, control valve devices of this type have an actuating member movable to and from positions corresponding to supply, lap or exhaust of the pneumatic pressure. Such an actuating member generally has a fixed neutral position corresponding to one of the supply, lap or exhaust functions and is movable to different positions to obtain the other of the two functions. Heretofore, control valve units have been constructed such that the particular function performed at the neutral position of the actuating means could not be changed. This oftentimes has proved to be extremely inconvenient. In accordance with the present invention, it is proposed to construct the valve in a manner such that the particular function performed by the valve in the neutral position thereof may be changed, in accordance with requirements, to either supply, lap or exhaust pneumatic pressure in the delivery line.

It is the principal object of the invention to provide a control valve unit of the type discussed above which is of simple design and economical to manufacture, incorporating therein the desired features and embodying various other features including among other the following:

The improved valve device comprises generally a body member having a supply port, a delivery port, and a valve mechanism for controlling the pneumatic pressure between the delivery port and the supply port.

The valve mechanism is of the self-lapping type having a stationary supply valve seat, an exhaust valve seat member coaxially and movably disposed therein, and a resiliently biased valve member common to both the supply and exhaust valve seats.

The exhaust valve seat member is longitudinally movable relative to the supply valve seat to supply, lap or exhaust the pneumatic pressure to and from the delivery port. The exhaust valve seat member is connected to an actuating lever rockably supported above the body for rocking movement toward and away from the valve body and is positionable to a clockwise limit position, a counter-clockwise limit position, a neutral position intermediate the two limit positions, an intermediate clockwise position between the neutral and clockwise limit positions, and an intermediate counterclockwise position between the neutral and counterclockwise limit positions.

Movement of the rockable lever from one position to another may be accomplished either by a handle suitably secured thereto, or where the conditions of the system in which the valve is employed so dictate, it may be controlled from a point remote from the control valve.

To accomplish the remote control, the control valve is provided with a pneumatic pressure operated lever control means comprising a pair of push rod members of which one is disposed on one side of the lever pivot and the other member on the opposite side thereof. The push rod members are each slidably disposed in ports and resiliently biased into engagement with the underside of the lever. Pneumatic pressure lines from the source are connected to the ports through which the pneumatic pressure to and from the ports is adapted to be selectively controlled by valve devices located remotely from the control valve. Selective application of pneumatic pressure to and from the ports positions the push rod members disposed therein relatively to each other to rock the lever about its pivot into positions corresponding to supply, lap or exhaust positions of the exhaust valve seat member.

The push rods are operative in any one of their relative locations within the bores to hold the lever in one of these positions until the valve devices are operated to change the pressure relationship between the bores whereupon the lever is moved to another of its positions and held therein until the pressure relationship between the bores is again changed.

To hold or retain the control lever in one of the above positions, there may be provided quick release holding means disposed on either side of the body member and formed with positioning means adapted to engage the lever in a manner to hold the latter in any one of the neutral, intermediate clockwise, clockwise limit, intermediate counterclockwise or counterclockwise limit positions.

The particular function performed by the valve device at the different positions of the lever to supply, lap or exhaust the delivery port is dependent on the relative position of the stationary supply valve seat to the movable exhaust valve seat member. That is to say, in one stationary position of the supply valve seat, the neutral position of the lever may be effective to locate the exhaust valve seat member so that it is to lap the delivery port, while in the respective clockwise and counterclockwise limit positions, and it is effective to exhaust and supply the delivery port. Under some circumstances, it may be desirable to change the above lap function of the neutral position of the lever to perform either a supply or exhaust function.

In accordance with the present invention, means are provided for mounting the stationary supply valve seat member in the body so that it may be selectively located within the body of the valve and relatively to the neutral position of the exhaust valve seat member so that the function of the neutral position of the lever may be changed.

Provision is also made for optionally mounting two valve mechanisms in the body arranged to be operated by the single actuating lever so that the control valve unit may be employed with an actuator unit or units requiring coordinated operation. For example, under some circumstances, it may be desired to control the supply and release to and from opposite ends of an actuator cylinder having a piston means movable in response to the pressure differential. In accordance with the present invention the body of the control valve unit is formed with two equal-sized cavities communicating with the supply port and associated with separate delivery ports. The cavities are located and arranged so as to receive identical valve mechanisms for actuation by the lever so that in the neutral position thereof both of the valve mechanisms perform a lap function while in the other positions the valve mechanisms perform opposite functions of supply and exhaust. Hence, when this arrangement is employed with the actuator unit of the above-mentioned type, the coordination of the supply and release of pneumatic pressure to and from each end of the cylinder is coordinated by a single position of the actuating means.

Other features and advantages of the invention will be apparent from the specification and claims when considered in connection with the drawings in which:

FIG. 1 is a front, elevational, cross section view of the control valve device embodying the present invention, shown associated with an actuator unit adapted to be supplied with pneumatic pressure for moving the shaft in one direction and effective by an opposing biasing force upon release of pneumatic pressure from the cylinder to move the operating shaft in the opposite direction.

FIG. 2 is a bottom view of the control valve device embodying the invention.

FIG. 3 is a top plan view of the control valve device, shown in FIG. 1.

FIG. 4 is a side elevational view of the control valve device of FIG. 1.

Figure 6:
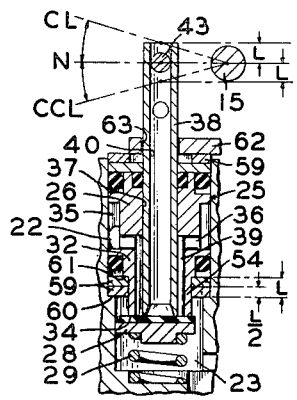
FIG. 6 is a fragmentary cross-sectional view of the valve device showing, in particular, the arrangement of the locating members for locating the valve mechanism at lap in the neutral position of the lever.
Figure 7:
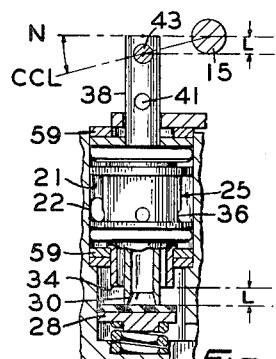
Figure 8:
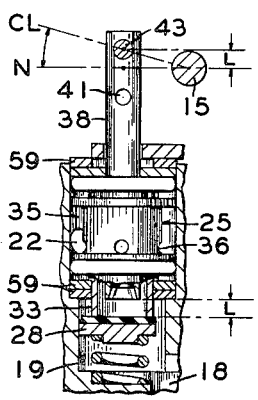

FIGS. 7 and 8, partially in cross section, are similar to FIG. 6 but showing the relationship of the lever position to the elements of the valve mechanism in the supply and exhaust positions, respectively.

Figure 9:
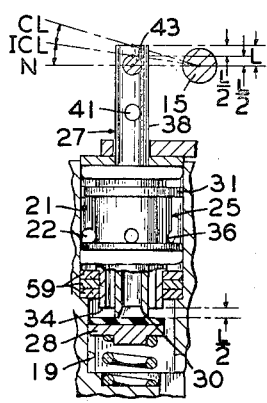

FIG. 9 is a fragmentary view, partially in cross section, of the valve device showing the arrangement of the locating members for locating the valve mechanism at supply in the neutral position of the actuating lever.

Figure 10:
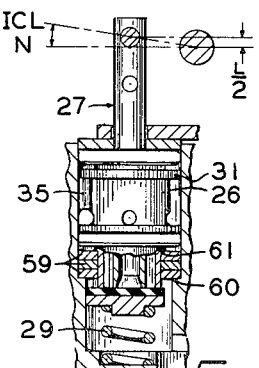
Figure 11:
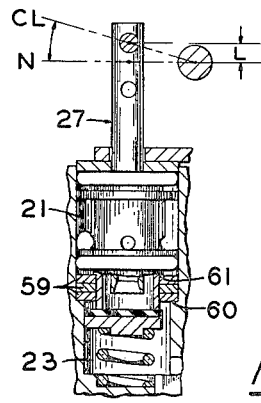

FIGS. 10 and 11 are similar to FIG. 9 but showing the relationship of the lever position to the elements of the valve mechanism in the lap and exhaust positions, respectively.

Figure 12:
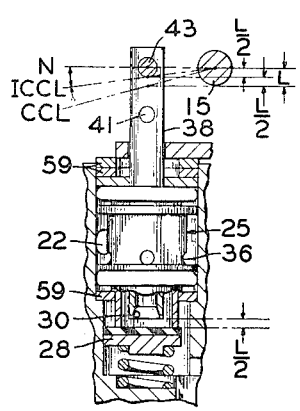

FIG. 12 is a fragmentary view of the valve, partially in cross section, showing, in particular, the arrangement of the locating members for locating the valve mechanism at exhaust in a neutral position of the lever.

Figure 13:
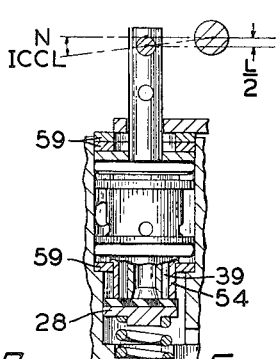
Figure 14:
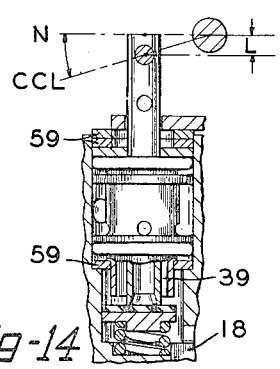

FIGS. 13 and 14 are similar to FIG. 12 but showing the relationship of the lever position to the elements of the valve mechanism in the lap and supply positions, respectively.

Figure 15:
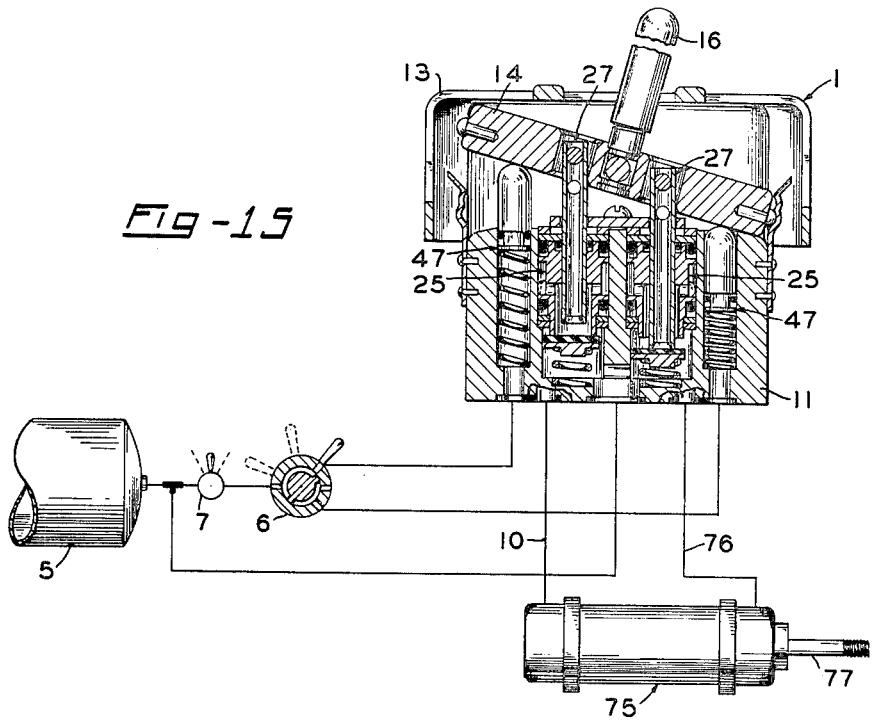

FIG. 15 is a view of the valve device embodying the present invention and incorporating therein two valve mechanisms and showing the valve unit associated with an actuator unit responsively movable and to pneumatic pressure differentials applied on the opposite sides of the cylinder.

*Description of FIGS. 1–14*

For purposes of illustration, the control valve device 1 of the present invention is shown in FIGS. 1–5 with an actuator unit 2 of the type including generally a cylindrical housing 3 having a piston means, not shown, an operating shaft 4 suitably connected to the piston means for movement therewith, a reservoir 5 charged by a compressor (not shown) for supplying fluid by way of the control valve 1 to the cylinder 3, a three-position pilot valve 6 for remotely operating the control valve 1, and a pressure magnitude controlling device 7 for controlling the magnitude of pressure at the pilot valve 6.

In the embodiment shown, the actuator unit 2 is of the type is which the application of a pneumatic pressure is operative to move the piston to the right and upon release of pneumatic pressure a biasing force in the form of a compression spring or the like (not shown) is operative to move the piston in the opposite direction. In this manner, the operating shaft 4 may be selectively positioned at either limit of travel of the piston. Under some circumstances, it may also be desirable to position the operating end of the shaft 4 intermediate the limits of travel thereof.

The position or location of the operating shaft 4 at either limit or intermediate positions is accomplished by the control valve 1. The control valve is connected intermediate the reservoir 5 and the actuator 2 by way of lines 8, 9 and 10.

The control valve device 1 comprises generally a body 11 having formed integral therewith a pair of spaced upstanding flanges 12 on the upper ends of which there is tightly fitted a cover 13. Secured for movement between the flanges 12 is an actuating lever 14 rockable about a pivot stud 15 fixed between the flanges 12. Attached to the lever 14 is a handle 16 projecting above the cover 13 through a slot 17 provided therein.

The body 11 is formed with an inlet supply port 18 connected to the reservoir 5 by the lines 8 and 9 and is in constant communication with a pair of equal sized, spaced cavities 19 and 20 formed on either side of the center line of the body 11. Each of the cavities 19 and 20 is formed with an upper chamber 21 communicating with a delivery port 22 and a lower chamber 23 communicating constantly with the supply port 18.

The upper chamber 21 of the cavity 20 is sealed by a plug 24 removably seated therein. To prevent leakage between the cavity and plug walls, suitable sealing means, such as an O-ring, is disposed about the plug 24. It is to be observed that the plug 24 serves to cut off communication between the lower chamber 23 and the delivery port 22 communicating with the upper chamber 21.

Disposed in the other cavity 19 is a valve mechanism 25, shown in detail in FIGS. 6–14, for controlling the supply and release of pneumatic pressure to and from the delivery port 22. The valve mechanism 25 comprises a supply valve member 26 and an exhaust valve member 27 and a valve member 28 common to both the supply and exhaust valve members 26 and 27.

The valve member 28 is of the disc or poppet type having a sealing gasket in the upper face and is disposed in the lower chamber 23 of the cavity 19 and is biased upwardly by a spring 29 and the pneumatic pressure in the cavity into contact wtih an exhaust valve seat 30 formed on the lower end of an exhaust valve member 27 so as to be yieldingly held thereagainst.

The supply valve member 27 is removably held within the cavity 19 and is formed with an upper portion 31 snugly received within the upper chamber 21, an intermediate portion 32 of lesser diameter than the upper portion, and a still further reduced lower portion 33 having an annular supply valve seat 34 formed on the terminal end thereof. Suitably disposed about the upper portion 31 are O-rings which serve to maintain an airtight seal. The outer wall of the upper portion 31 is formed with a peripheral groove defining with the cavity wall, a passageway 35 communicating with the lower chamber of the cavity by way of radial passages 36 and an axial bore 37 of which the lower end is formed of larger diameter than the upper end thereof.

Longitudinally movable in the axial bore 37 is a stem 38 of the exhaust valve member 27 and defining with the lower enlarged end of the bore 37, a peripheral passageway 39 communicating with the radial passages 36. The exhaust valve stem 38 is formed with an open-ended axial bore 40 providing a venting passage constantly exposed to atmosphere. Additional radial venting openings 41 may be provided adjacent the upper end of the stem 38.

The upper end of the exhaust valve stem 38 extends into an opening 42 in the lever 14 and is connected for movement with the lever 14 by a pin 43. The opening 42 is formed large enough to permit rocking of the lever 14 relative to the linearly movable exhaust valve member 27.

It is to be noted that an additional exhaust valve stem opening 42 is provided on the opposite side of the lever and that an additional exhaust valve connecting pin 43 extends therethrough.

Figure 5:
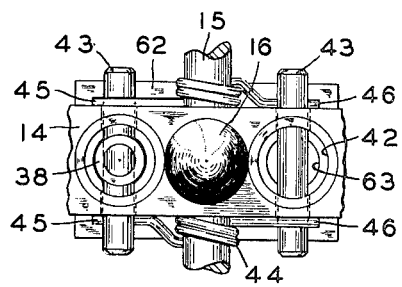
FIG. 5 is a fragmentary enlarged plan view of the top of the control valve device with the cover removed and showing the manner in which the exhaust valve seat member supporting pins are mounting in the lever.

As shown in FIG. 5, each of the pins 43 are loosely fitted in the lever 14 having their terminal end projecting beyond the sides thereof. The pins 43 are supported at their projecting ends by locating spiral springs 44 carried on the lever pivot stud 15. The springs are arranged such that on one side of the lever 14 one of ends 45 engages the top side of the left pin and the other end 46 engages the underside of the right pin, while the spring 44 on the opposite side of the lever 14 is arranged so that the end 45 engages the bottom side of the left pin and the end 46 engages the top side of the right pin. In this manner each of the pins 43 are more or less yieldingly supported on the lever 14.

As shown in FIGS. 6, 7 and 8, a change in position of the lever 14 from its neutral position N (FIG. 6) to a counterclockwise limit position CCL (FIG. 7) or clockwise limit position CL (FIGS. 1 and 8) causes a corresponding change of position of the exhaust valve 27 relative to the supply valve seat 34 of the supply valve member 26 stationarily mounted within the cavity 19. Hence, as shown in FIG. 7, when the lever 14 is positioned at its counterclockwise limit position CCL, the exhaust valve member 27 is moved downwardly and operative to displace the valve member 28 away from the supply valve seat 34 so that the passageway 39 communicates with the lower chamber 23 whereby pneumatic pressure from the supply port 18 is applied to the delivery port 22 via passages 35 and 36.

Movement of the lever 14 to its clockwise limit position CL, as shown in FIG. 1, lifts the exhaust valve member 27 so that exhaust valve seat 30 is spaced above the valve member 28 resulting in the spring 29 and the pressure within the cavity 19 urging the valve member 28 against the supply valve seat 30 thereby cutting off communication of the supply port 18 with the delivery port 22 and being operative to vent the latter via passageways 35, 36, 39 and venting bore 40.

As shown in FIG. 6 in the neutral position N of the lever 14, the valve member 28 is urged upwardly by the spring 29 to contact both the exhaust and supply valve seats 30 and 34, whereby the exhaust valve is in a lap position. Proper seating of the exhaust valve seat 30 on the valve member 28 is assured by the yielding action of the springs 44 which exert a lesser force than the spring 29 and the pressure within the cavity 23.

The above-described positioning of the exhaust valve 27 may be accomplished by manipulation of the handle 16 provided on the lever 14.

For the purpose of providing remote control or positioning of the lever, there is provided a pair of push rod assemblies 47 located to contact the lever 14 on opposite sides of the pivot 15. Each of the push rod assemblies 47 comprises generally a push rod 48 sealingly reciprocal in bores 49 and 50 formed in the valve body 11. The bores 49 and 50 as shown are communicable with the reservoir 5 via lines 51 and 52, respectively, and line 8 so that pneumatic pressure may be selectively supplied to the lines 51 and 52 and bores 49 and 50, in a manner to be explained hereinafter. Seated within the lower end of each of the bores 49 and 50 is a spring 53 for urging the push rod 48 into contact with the lever 14. The springs are balanced so as to apply substantially the same force on both ends of the lever 14 whereby the latter is maintained substantially horizontal in its neutral position N.

To selectively introduce the pneumatic pressure into lines 51 and 52 and thereby into the bores 49 and 50, there is provided the three-way pilot or selector valve 6 and the fluid pressure magnitude control valve 7 connected via line 8 to the reservoir 5. The pressure magnitude control valve 7 may be of the self-lapping type disclosed in U.S. Patent 2,042,112. The valve 7 is operative by selective positioning of its handle to control the magnitude of pneumatic pressure flowing to the three-way pilot valve 6.

In the valve arrangement shown in FIGS. 1, 6, 7 and 8, the handle of the valve 7 is positioned at F to provide pressure adequate to move the lever 14 from its neutral position N to either its limit positions CL or CCL against the biasing force exerted by the spring 53 provided in each of the bores 49 and 50.

When the three-way pilot valve 6 is in the position A, both of the bores 49 and 50 are vented to atmosphere through the respective lines 51 and 52 by way of pilot valve port 55 so that both of the push rods 48 are pushed upwardly by the equally balanced springs 53 to hold the lever 14 to its neutral position N corresponding to the lap position of the exhaust valve. In the position B of the pilot valve 6, pneumatic pressure is applied to the pilot bore 50 via pilot ports 56 and 57 and line 52. At the same time, the bore 49 is vented to atmosphere via line 46 and pilot ports 58 and 55. In this manner, the pneumatic pressure is operative to force the right push rod in the bore 50 upwardly into engagement with the lever 14 thereby to rock it counterclockwise against the biasing force of the spring 53 in the bore 49 into its counterclockwise limit position CCL corresponding to the supply position of the exhaust valve. Conversely, when the pilot valve 6 is in the position C, the bore 50 is vented via lines 52 and pilot ports 57 and 55 and pneumatic pressure is applied to the bore 49 via pilot ports 56 and 58 and line 51 thereby to rock the lever 14 clockwise to its clockwise limit CL position corresponding to the exhaust position of the exhaust valve 28.

Under some circumstances, it may be desirable that the neutral position N of the lever 14 locate the exhaust valve 27 so that it is in either supply or exhaust positions. In accordance with the present invention, there is provided a means for mounting the supply valve 26 in the cavity 19 so that the position of its valve seat 34 relative to the neutral position of the exhaust valve seat 30 is changed and, accordingly, changing the function performed by the valve device at the neutral position.

Referring in particular to FIGS. 6–14, this is accomplished by the provision of a plurality of annular location members 59 which in the preferred form are equal thickness annular collars. The collars 59 are interchangeably positionable between a valve supporting position adjacent the bottom of the cavity 19 to a cavity filling position on the top of the valve mechanism 25.

To provide for a lap position of the valve mechanism 25, in the neutral position N of the lever 14, as shown in FIGS. 1, 6, 7 and 8, two of the collars 59 are seated within the lower end of the upper chamber 21 resting on an annular shoulder 60. The lower portion 33 of the supply valve member 26 is snugly seated within an axial opening 54 in the collars 59 so that a shoulder 61 is supported on the inner edge of the upper collar 59. The other collar 59 is positioned on the top of the supply valve member 26 over which there is disposed in clamping relationship a clamping plate 62 having an opening 63 through which the exhaust valve stem 38 is adapted to move freely. The clamping plate 62 is detachably held on the body 11 by a screw 64.

With this arrangement of the collars 59, as previously described, the clockwise limit position CL of the lever 14 is operative to relocate the exhaust valve seat 30 above the supply valve seat 34 to an exhaust position and in the counterclockwise limit position CCL, the lever 14 is operative to position the exhaust valve seat 30 below the supply valve seat 34 to a supply position. As shown in FIGS. 6, 7 and 8, the length of travel L of the exhaust valve seat 30 from its lap to supply or exhaust positions are substantially equal and are also equal to the sum of the thickness of the two location members 59 supporting the same. Hence, the thickness of one of the equal thickness location members 59 is equal to $L/2$.

In view of the above relationship of the length of travel of the exhaust valve seat 30 with the thickness of the location members 59, the functions of the valve 1 in the neutral position of the lever 14 may be changed by relocating the supply valve members 26 upwardly or downwardly within the cavity 19 by the addition or deletion of one of the location members 59 supporting the supply valve member 26 within the cavity 19. Such addition or deletion results in displacing the supply valve seat 34 a distance $L/2$ relative to the exhaust valve seat 30 to provide a supply or exhaust function in the neutral position of the lever 14 as more fully explained below.

If the control valve unit 1 is employed with an actuator requiring a supply of pneumatic pressure for the greater period of its operation so that it is desirable that the neutral position of the lever 14 provide this function, the arrangement illustrated in FIGS. 9, 10 and 11 is employed. As shown, the three collars 59 are seated in the lower portion of the upper chamber 21. The addition of the one collar 59 causes the supply valve seat 34 to be displaced upwardly a distance equal to one-half ($\frac{1}{2}$) of the total travel L of the exhaust valve seat 30 from its neutral position N to its clockwise limit position CL.

In this manner the valve device 1 is operative in the neutral position N of the lever 14 to maintain a pneumatic pressure supply to the delivery port 22 and thereby to the actuator 2 with which it is employed. To move the exhaust valve member 27 to either lap or exhaust positions, the lever 14 is rocked clockwise, because obviously counterclockwise movement will be operative to space the exhaust valve seat 30 further from the supply valve seat 34. Since the valve seat has been displaced upwardly $L/2$, location of the lever 14 corresponding to this displacement, i.e. to the intermediate clockwise limit position ICL, is operative to position the exhaust valve member 27 in a lap position as shown in FIG. 10. Further rocking of the lever 14 to its clockwise limit position CL (FIG. 11) is operative to move the exhaust valve 30 the remaining distance $L/2$ so that it is spaced above the valve member 28 and the supply valve seat 34 whereby the valve mechanism 25 is operative to exhaust the delivery port 22 and the actuator 2.

As illustrated in FIGS. 12, 13 and 14, only one of the collars 59 is used to support the supply valve 26 at the lower end of the upper chamber 21 so that the supply valve seat 34 is effectively lowered $L/2$ relative to neutral position N of the exhaust valve seat 30. The exhaust valve seat 30 is thereby spaced downwardly from the supply valve seat 34 and at the same time depresses the valve member 28 out of engagement with the latter to vent the delivery port 22. Counterclockwise movement of the lever 14 to its intermediate counterclockwise position ICCL corresponds to a lap position while movement to its counterclockwise position CCL results in a supply position, as shown in FIGS. 13 and 14, respectively. These positions of the exhaust valve seat 30 follow because of the relationship of the thickness $L/2$ of the collars 59 with the distance of travel L of the exhaust valve, as discussed above.

Secured to each end of the body 11 and in the line of movement of the lever 14 are spring clips 65 and 66. The spring clip 65 is formed with an outwardly bowed end 67 operative to contact the underside of the lever in its neutral position and two indentations 68 and 69 of which the indentation 68 is operative to receive a button 70 force-fitted in the left end of the lever 14 in its intermediate counterclockwise position ICCL and the indentation 69 for receiving the button 70 in the intermediate counterclockwise lever position ICCL. The clip 66 is similarly formed with a bowed end 71 operative to contact the opposite end of the lever 14 in its neutral position, an indentation 72 for receiving lever button 70 located on the right end of the lever 14 in the intermediate clockwise position ICL thereof, and an indentation 73 for receiving the button 70 in the clockwise limit position CL.

The spring clips 65 and 66 are operative to hold the lever 14 in any one of its operative positions until a manipulating force is applied thereto as by the handle 16 or the push rod assemblies 47. It is, of course, to be understood that when the push rod assemblies 47 are employed the spring clips may be removed because the pressure exerted on the push rods is adequate to hold the lever 14 positioned.

*Operation of FIGS. 1–8*

In operation let it be assumed that the supply valve member 26 is located within the cavity 19 resting on two of the locating members or collars 59 and that the lever 14 is in the neutral position N so that the exhaust valve member 27 is in a lap position, in which position both the exhaust valve seat 30 and supply valve seat 34 contact the common valve member 28. Let it be further assumed that the cylinder 3 of the actuator 2 is devoid of pneumatic pressure and the operating shaft 4 is in its fully retracted position or in an extreme left location, as viewed in FIG. 1.

Assuming also that the conditions are such, the control valve unit 1 is manually controlled and the pilot valve 6 is in the position A to close off communication of the pneumatic pressure to lines 51 and 52 and the reservoir 5 has been suitably charged so pneumatic pressure is introduced in the lower chamber 23 of the control valve cavity 19 via supply port 18 and lines 8 and 9. To move the operating shaft to the right against the opposing biasing force in the cylinder 3, as illustrated in FIG. 6, the lever 14 is rocked by way of the handle 16 to its CCL position causing downward movement of the exhaust valve member 27 through the distance L thereby unseating the valve member 28 from the annular supply valve seat 34 against the force of the spring 29 and the pneumatic pressure in the lower chamber 23. With the valve member 28 thus unseated, the pneumatic pressure passes from the lower chamber 23 through passageways 39, 36 and 35 into the delivery port 22, shown in FIGS. 6–8, and then by way of line 10 into the left end of the actuator cylinder 3 whereupon the shaft 4 is moved to the right into a fully extended limit position.

It is to be noted that when the lever 14 is rocked counterclockwise to its CCL position, the button 70 on the end of lever 14 is received in the indentation 69 of the spring clip 65 so that the lever is held in a fixed position until a manual force is applied to the handle 16 to move it into one of the other positions.

To move the operating shaft to its extreme left limit position, the lever is rocked clockwise to its clockwise limit position CL, as shown in FIG. 8, whereupon the exhaust valve member 27 is moved upwardly within the supply valve bore 37 so that the exhaust valve seat 30 is spaced out of contact with the valve member 28 the distance L. In this position the resilient spring 29 and the pneumatic pressure in the lower chamber 23 biases the valve member 28 upwardly into contact with the supply valve seat 34 so that pneumatic pressure is no longer delivered into the delivery port 22. With the exhaust valve seat 30 spaced above the valve member 28, the delivery port 22 and thereby the actuator cylinder 3 is vented to atmosphere via passageways 35, 36 and 39 and the axial bore 40 and radial venting openings 41 in the exhaust valve stem 38. Thus, the pneumatic pressure is released from the cylinder 3 and the piston is urged, by way of its opposing biasing force, to the left so that the operating shaft 4 is moved to its extreme left position. In the clockwise limit position CL of the lever 14, the right end of the lever 14 is resiliently held by the spring clip 66 which receives the button 70 in the indentation 73.

Under some circumstances it may be desirable to position the operating shaft 4 of the actuator, intermediate its extreme left and right-hand positions. Under these circumstances only part of the pneumatic pressure is released from the actuator cylinder 3 so that a partial pneumatic pressure remains therein reacting against the opposing biasing force. This is accomplished by returning the actuating lever to its lap position shown in FIG. 6. It is, of course, to be understood that the particular intermediate position desired will be dependent on the relationship of the magnitude of the partial pressure on one side to the magnitude of the biasing force on the other side of the actuator piston. Hence, to obtain the magnitude of partial pressure corresponding to a desired position, the lever 14 is rocked on a more or less trial and error basis between its supply and exhaust positions until the desired position of the operating shaft 4 is obtained. However, when the desired position between the two extreme locations of the operating shaft 4 is achieved, the lever 14 is positioned in its neutral position N with the exhaust valve member 27 in its lap position with both the exhaust valve seat 30 and the supply valve seat 34 in engagement with the valve member 28 urged thereagainst by the spring 29 and the pressure in the lower chamber 23. In this position the pneumatic pressure is not exhausted and the supply valve is cut off from the delivery port so that only the partial pressure is retained within the actuator cylinder 3.

It is to be observed that in the neutral position N of the lever 14 the bowed ends 67 and 71 of the spring clips 65 and 66 simultaneously support the lever 14 so as to prevent relative movement therebetween until the handle 16 is manually moved or another force sufficient to overcome the holding force of the bowed ends 67 and 71 is applied thereto.

If desired, the lever 14 may be moved into its different positions N, CL or CCL and thereby the exhaust valve 27 from a remote location by supplying pneumatic pressure to one of the push rod assemblies 47. This is accomplished by setting the pressure magnitude valve 7 to the position F corresponding to a pneumatic pressure capable of overcoming the biasing force exerted by the springs 53 through the travel of the lever between the neutral position N to either of the limit positions CL or CCL.

In the event it is desired to position the operating shaft 4 in its extreme right position, the pilot valve 6 is moved to the B position thereof whereupon pneumatic pressure at the desired magnitude is introduced into the bore 50 via line 52 forcing the push rod assembly 47 in the bore 50 upwardly and against the force of the spring 53 in the bore 49 so as to rock the lever into its counterclockwise limit position CCL whereupon the button 70 seats within the indentation 69 of the spring clip 65.

When the lever is thus located in its counterclockwise limit position CCL, the exhaust valve 27 is shifted downwardly, valve seat member 28 is unseated from the supply valve seat 34 and the cavity 19 in the valve body is in communication with the delivery port 22 via passages 39, 36 and 35, as previously described to introduce fluid pressure into the actuator cylinder 3 to move the shaft to its extreme right position.

To return the operating shaft 4 to its extreme left position, the pilot valve 6 is located at position C to exhaust the port 50 and at the same time to apply pneumatic pressure to the port 49 via line 51 so as to move the push rod 48 located therein upwardly whereupon the lever 14 rocks about its pivot 15 against the force exerted by the spring 53 in the bore 50. The exhaust valve seat 30 is thus spaced above the valve seat member 28 to exhaust the delivery port via passages 35, 36, 39 and 40 so as to release pneumatic pressure from the cylinder 3 so that the operating shaft 4 is returned to its extreme left position by the resilient biasing force means disposed therein.

*Operation of FIGS. 9, 10 and 11*

When it is desired to alter the function of the neutral position N of the lever 14, the valve mechanism 25 is removed from the body 11 by removing the exhaust valve member pins 43 from the lever 14 so that the exhaust valve member 27 may be removed from the bore 37 of the supply valve 26. Thereafter, the clamping plate 62 is released and the supply valve member 26 is removed from the cavity 19. The collar 59 formerly overlying the body as in FIGS. 6, 7 and 8 is then located at the bottom of the cavity 19 with the other two collars 59. The supply valve member 26 and exhaust valve member 27 are then reassembled. In this position of the supply valve member 26, as heretofore explained, the neutral position N of lever 14 is operative to locate the supply valve seat 34, exhaust valve seat 30, and the common valve 28 relatively to each other, as shown in FIG. 9, to supply pneumatic pressure to the delivery port 22 so that the operating shaft 4 is urged and held in its extreme right position. To exhaust the cylinder 3, the lever 14 is located in its clockwise limit position CL (FIG. 11), while to retain a partial pressure within the cylinder to obtain an intermediate position of the operating shaft the lever 14 is placed in its intermediate clockwise position ICL (FIG. 10).

Operation of the control valve 1 from a remote location is achieved by positioning the pilot valve 6 at the position C so that pneumatic pressure may be applied only to the port 49. The pressure magnitude controller 7 is thereafter employed to selectively relocate the lever into its different functional positions. To position the lever in the neutral supply position, the controller handle is set at an exhausting position E so that the fluid pressure is exhausted to atmosphere from bore 49 via line 51 so that the push rod assemblies 47 are both urged upwardly under the influence of the equally balanced springs 53 to hold the lever horizontal. To move the lever 14 to its clockwise limit position CL to an exhaust function, as shown in FIG. 11, the controller handle 54 is set at F to provide the pressure required to overcome the biasing force of the spring 53 in the bore 50. Positioning of the lever 14 to its lap function at ICL is accomplished by setting the controller handle 54 at HF to provide in the bore 49 a lesser pneumatic pressure than that required to overcome the biasing force of the spring 53 to its clockwise limit position CL.

*Operation of FIGS. 12, 13 and 14*

Referring now to FIG. 12, in which the valve device 1 is arranged so that an exhaust function is obtained in the neutral position N of the lever 14, the valve mechanism 25 is disassembled, as described above, and when assembled only one of the collars 59 is located in a supporting position and the remaining two are in an overlying position. With this location of the supply valve 26, the lever 14 in its intermediate counterclockwise limit position ICCL or limit position ICL results in a lap and supply function of the valve device, respectively, as shown in FIGS. 10 and 11, respectively.

Remote positioning of the lever 14 is accomplished similarly to that described in connection with FIGS. 9, 10 and 11 with the exception that the pilot valve 6 is positioned at B so that bore 50 is communicable with pressure source via line 52 while bore 49 is exhausted. Positioning of the controller handle 54 to the positions E, HF or F results in positioning the lever 14 in its neutral, intermediate clockwise limit position ICL or clockwise limit position CL corresponding to exhaust, lap and supply, respectively.

While the operation of the control valve 1 has been described with the valve device 25 positioned in the left cavity 19 and right cavity 20 sealed by the plug 24, it is to be understood, of course, that this arrangement may be reversed without any material alterations in the operation of the control valve device in the event that the pneumatic pressure is introduced into the right end of the actuator 3.

*Description of FIG. 15*

Referring now to FIG. 15, there is shown a control valve embodying the invention in which both of the cavities 19 and 20 are provided with valve devices 25 of identical structure. This structure, for purposes of illustration only, is shown associated with an actuator 75 in which pneumatic pressure is employed to move the piston (not shown) in both directions of movement thereof.

In the arrangement shown in FIG. 14, the supply valves 26 are arranged in their respective cavities 19 and 20 supported on two of locating members 59 so that as explained in connection with FIGS. 6, 7 and 8 in the neutral position of the lever N, each of the valves is in a lap position. Location of the lever 14 to its clockwise limit position CL, as shown in FIG. 15, is operative to position the right valve device 25 to a supply position so that pneumatic pressure is delivered to the right end of the actuator 75 via line 76 and the left valve device 25 is in its exhaust position to release pressure from the left end of the actuator 75 via line 10. In this manner, the operating shaft 77 is positioned at its extreme left position. Locating the lever 14 in its counterclockwise limit positions CCL results in a reversal of the positions of the right and left valves 25 and a corresponding change in function so that pneumatic pressure is delivered to the left end and released from the right whereupon the operating shaft is positioned at its extreme right position.

Selective intermediate positioning of the operating shaft 77 is accomplished by rocking of the lever 14 between its clockwise and counterclockwise positions CL and CCL, to achieve a pressure differential on opposite sides of the piston corresponding to the selective position as explained in connection with FIG. 1. The lever 14 is then returned to its neutral position N in which both of the valve devices 25 are in lap to retain this pressure differential and thereby to maintain the operating shaft 77 in its desired position intermediate the limits of travel.

Having now described the invention, what we claim as new and desire to secure by Letters Patent, is:

1. A control valve device comprising a body having a pneumatic pressure supply inlet; a cavity communicating with said supply inlet; a delivery port communicable with said cavity; a valve mechanism in said cavity for controlling the pneumatic pressure in said delivery port, said valve mechanism comprising a stationary supply valve seat member having an open ended axial bore and having an annular supply valve seat formed on one end thereof, a displaceable valve in said cavity seatable on said supply valve seat, a hollow, open-ended exhaust valve stem coaxially and slidably disposed in said open-ended axial bore of said supply valve member and having an exhaust valve seat on one end thereof seatable on said valve, said exhaust valve stem being positionable to locate said exhaust valve seat relative to said supply valve seat and said valve to supply, lap and exhaust pneumatic pressure in said delivery port, actuating means connected to the other end of said exhaust valve stem and being movable between predetermined spaced limit positions and a neutral position intermediate said spaced limit positions for locating said exhaust valve seat into the different ones of said supply, lap and exhaust positions, and means selectively mounting said stationary supply valve seat member in said cavity for locating said supply valve seat and said valve relatively to said exhaust valve seat in said neutral position of said actuating means to any one of said supply, lap and exhaust positions and retaining the remaining two of said supply, lap and exhaust locations of said exhaust valve seat at different positions of said actuating means between said predetermined spaced limit positions thereof.

2. The control valve as defined in claim 1, wherein said supply valve seat member selective mounting means comprises a plurality of collars interchangeably positionable from a supply valve seat member supporting position and a cavity filling position overlying said supply valve seat member, said collars being of a thickness substantially less than the distance through which the exhaust valve seat is moved between said neutral position of said actuating means and one of said limit positions thereof.

3. The control valve as defined in claim 1, wherein said supply valve selective locating means comprises a plurality of collars interchangeably positionable from a supply valve seat member supporting position and a cavity filling position overlying said supply valve seat member, said collars each being of a thickness equal to substantially less than the distance through which said exhaust valve seat is moved between said neutral positions of said actuating means and one of said predetermined limit positions thereof.

4. The control valve device as defined in claim 1, wherein said supply valve selective locating means comprises three collars interchangeably positionable from a valve seat member supporting position and a cavity filling position overlying said supply valve seat member, said collars each being of a thickness equal to one-half the distance through which said exhaust valve seat is moved between said neutral position of said actuating means and one of said limit positions thereof so that when two of said locating members are employed in said valve supporting positions said exhaust valve is in said lap position and so that the addition or deletion of a collar to or from said two collar members supporting said supply valve seat member causes a corresponding relocation of said supply valve seat relative to said neutral position of said exhaust valve seat of one-half the total distance through which said exhaust valve seat moves to one of said limit positions whereby said exhaust valve is positioned to supply or exhaust the delivery port, respectively, in said neutral position of the actuating means.

5. The invention as defined in claim 1, in which said actuating means comprises a lever rockably supported intermediate its end about a pivot and positionable between a clockwise limit position and a counterclockwise limit position, and a neutral position intermediate said clockwise and counterclockwise positions.

6. The invention as defined in claim 5, in which there is provided quick release holding means engageable with said lever for holding said lever in positions corresponding to supply, lap or exhaust locations.

7. The invention as defined in claim 6, in which said quick release means comprises spring clips having means for holding said lever in said neutral positions and indentations corresponding to different operating positions of said lever, and in which each end of said lever is provided with a button receivable within said spring indentations.

8. The control means as defined in claim 5, wherein means are provided for positioning said lever from a location remote from said control valve comprising a pair of push rods located on opposite sides of said lever pivot, means normally biasing said push rods into contact with said lever to bias said lever to a predetermined position, and means providing a bore for slidably supporting each of said push rods and each bore having one end thereof communicable with a fluid pressure source for applying selectively to one of said push rods a force opposing said biasing means whereby said push rods are moved relatively to each other and thereby to rock said lever into one of its operative positions.

9. A control valve comprising a body having a pneumatic pressure supply inlet, cavity communicating with said supply inlet, a delivery port communicable with said cavity, a valve mechanism in said cavity for controlling the pneumatic pressure in said delivery port, said valve mechanism comprising a stationary supply valve seat member having an open-ended axial bore and having an annular valve seat formed on one end thereof, a displaceable valve disposed in said cavity between said supply seat member and said supply inlet seatable with said supply valve seat, a hollow, open-end valve stem coaxially and slidably disposed in said axial bore and having an exhaust valve seat on one end thereof seatable with said displaceable valve, said exhaust valve stem being positionable to locate said exhaust valve seat relative to said supply valve seat and said valve selectively to supply, lap and exhaust pneumatic pressure in said delivery port, an actuating lever connected to said exhaust valve stem, a fixed pivot means rockably mounting said lever intermediate its ends for movement from a neutral position to a first predetermined position spaced from said neutral position and a second predetermined position spaced from said first position, said neutral, first and second lever positions each corresponding to a different one of said supply, lap or exhaust positions of said exhaust valve seat, and quick release means holding said lever in one of said neutral, first and second positions.

10. A control valve comprising a body having a pneumatic pressure supply inlet; cavities communicating with said supply inlet; a delivery port associated with each of said cavities and being communicable with said associated cavity, a valve mechanism in each of said cavities for controlling the pneumatic pressure in said associated delivery port, said valve mechanism comprising a stationary valve seat member having an open-ended axial bore and supply valve having an annular valve seat formed on one end thereof, a displaceable valve disposed in said cavity between said supply seat member and said supply inlet seatable with said supply valve seat, a hollow, open-end valve stem coaxially and slidably disposed in said axial bore and having an exhaust valve seat on one end thereof seatable with said displaceable member, said exhaust valve stem being positionable to locate said exhaust valve seat relative to said supply valve seat and said valve to selectively supply, lap and exhaust pneumatic pressure in said associated delivery port; an actuating lever, fixed pivot means between said cavities and rockably mounting said lever intermediate its ends for movement from a neutral position to a first predetermined position spaced from said neutral position and a second predetermined position spaced from said first position, and means connecting one said valve stem to said neutral, first and second lever positions each corresponding to a different one of said supply, lap or exhaust positions of said exhaust valve seat, and quick release means holding said lever in one of said neutral, first and second positions, and means connecting the other ends of said valve stems to said lever on opposite sides of said pivot so that the supply, lap and exhaust locations of each said valve mechanisms are changed simultaneously when said lever is rocked from one of said positions to another of said positions thereby to coordinate the functions being performed by each of said valves.

11. A control device, comprising:
(a) a body having a pressure supply inlet,
(b) a pair of identical cylindrical cavities disposed in said body and communicating with said supply inlet,
(c) a separate delivery port in communicating association with each cavity,
(d) a valve mechanism removably disposed in one of said cavities and having a stem movable to control fluid flow between the supply inlet and the delivery port associated with said one cavity,
(e) a cylindrical member removably disposed in the other cavity and having a diameter substantially the same as said other cavity and having a sealer member peripherally disposed thereon to effect a seal between the cylindrical member and the body and of a length sufficient to prevent fluid flow from said supply inlet to the delivery port associated with said other cavity,
(f) said valve mechanism and said cylindrical member being adapted for interchangeability whereby a cylindrical member or a valve mechanism may be disposed in each cavity, and
(g) actuating means disposed on said body for relative movement with respect to said one cavity to effect movement of said valve stem and disposed adjacent said other cavity for similarly operating another valve mechanism when said another valve mechanism is installed in said other cavity in place of said cylindrical member.

12. A control device comprising:
(a) a body having a pressure supply inlet,
(b) a pair of identical cylindrical cavities disposed in said body and communicating with said supply inlet,
(c) a separate delivery port in communicating association with each cavity,
(d) a valve mechanism removably disposed in one of said cavities and having a valve and a hollow stem providing an exhaust passage, said hollow stem being movable with respect to said valve to selectively provide a fluid supply communication between the supply inlet and the delivery port associated with said one cavity and to provide an exhaust communication with respect to said associated delivery port via the passage in said hollow stem,
(e) a cylindrical member removably disposed in the other cavity and having a diameter substantially the same as said other cavity and having a sealer member peripherally disposed thereon to effect a seal between the cylindrical member and the body and of a length sufficient to prevent fluid flow from said supply inlet to the delivery port associated with said other cavity,
(f) said valve mechanism and said cylindrical member being adapted for interchangeability whereby a cylindrical member or a valve mechanism may be disposed in each cavity, and
(g) actuating means disposed on said body for relative movement with respect to said one cavity to effect movement of said stem and disposed adjacent said other cavity for similarly operating said stem of said valve mechanism when said valve mechanism and said cylindrical member are interchanged in their respective cavities.

13. A control device comprising:
(a) a body having a pressure supply inlet,
(b) a pair of cylindrical cavities disposed in said body and communicating with said supply inlet,
(c) a separate delivery port in communicating association with each cavity,
(d) said valve mechanism having a valve and a hollow stem providing an exhaust passage therethrough, said stem being movable selectively to different positions, in one of which it cooperates with said valve to open a supply communication between the supply inlet and the delivery port, in a second of which it cooperates with said valve to establish an exhaust communication from said delivery port to atmosphere and in a third of which it cooperates with said valve to lap the supply and exhaust communications,
(e) a cylindrical member removably disposed in the other cavity and having a diameter substantially the same as said other cavity and having a sealer member peripherally disposed thereon to effect a seal between the cylindrical member and the body and of a length sufficient to prevent fluid flow from said supply inlet to the delivery port associated with said other cavity, (f) said valve mechanism and said cylindrical member being adapted for interchangeability whereby a cylindrical member or a valve mechanism may be disposed in each cavity, and (g) actuating means disposed on said body for relative movement with respect to said one cavity to effect movement of said stem and disposed adjacent said other cavity for similarly operating said stem of said valve mechanism when said valve mechanism and said cylindrical member are interchanged in their respective cavities.

14. The control device as claimed in claim 13, further characterized in that said actuating means includes:

(a) a lever rockably supported intermediate its ends about a pivot and including (i) means for connecting said stem to said lever on one side of said pivot to effect movement of said stem when the valve mechanism is disposed in said one cavity and said cylindrical member is disposed in said other cavity, (ii) means for connecting said stem to said lever on the opposite side of said pivot to effect movement of said stem when said valve mechanism and said cylindrical member are interchanged in their respective cavities, (b) said lever being selectively movable to a clockwise limit position, a counterclockwise limit position, and an intermediate neutral position in which said stem is correspondingly positioned in said second, first and third positions, respectively, when said valve mechanism is disposed in said one cavity and said cylindrical member is disposed in said other cavity, and in which said stem is correspondingly positioned in said first, second and third positions, respectively, when said valve mechanism and said cylindrical member are interchanged in their respective cavities.

References Cited by the Examiner

UNITED STATES PATENTS 3,107,695 10/1963 Broadwell _____ 91—457 X

FOREIGN PATENTS 138,148 2/1920 Great Britain.

ISADOR WEIL, *Primary Examiner.*

WILLIAM F. O'DEA, *Examiner.*